United States Patent
Senckel

[11] 4,095,150
[45] June 13, 1978

[54] TWO-PHASE ASYNCHRONOUS MOTOR

[76] Inventor: Karlheinz Senckel, Goethering 54, 8015 Markt Schwaben, Germany

[21] Appl. No.: 704,466

[22] Filed: Jul. 12, 1976

[51] Int. Cl.² .............................................. H02K 1/00
[52] U.S. Cl. ..................................... 318/227; 310/268
[58] Field of Search ................. 310/268, 185, 166, 68; 318/195, 227, 230, 231

[56] References Cited

U.S. PATENT DOCUMENTS

| | | | |
|---|---|---|---|
| 2,068,820 | 1/1937 | Sarazin et al. | 310/185 |
| 3,229,137 | 1/1966 | McCarty | 310/268 |
| 3,315,106 | 4/1967 | Reynst | 310/268 |
| 3,699,372 | 10/1972 | Abe et al. | 310/268 |

*Primary Examiner*—Herman J. Hohauser
*Attorney, Agent, or Firm*—Omri M. Behr

[57] ABSTRACT

For the purpose of providing a two-phase asynchronous motor of the kind comprising a wound stator made up of two portions spacedly disposed parallel to each other and in which the flux flowing in all the field magnets of the stator is exclusively that of their own phase and in which sufficient space is available for a comparatively large number of field magnets, the stator windings of each phase are each accommodated in one said portion of the stator only and the poles of a member movable with respect to the stator are in the form of ferromagnetic bridges, surrounded and magnetically separated with respect to each other by a short-circuit element, the arrangement being such that the magnetic circuit of adjacent stator poles is completed directly via the pole shoes of the oppositely disposed portion of the stator. The invention is applicable to both linear and rotary motors. In the case of a rotary motor, the said member defines the rotor and the said element is in the form of a short-circuit cage.

10 Claims, 5 Drawing Figures

Fig. 4
Fig. 4a
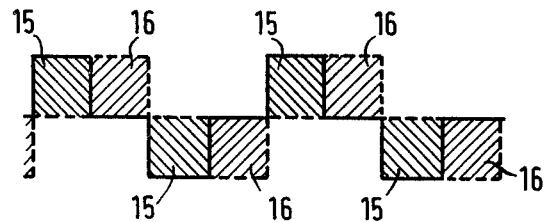
Fig. 4b
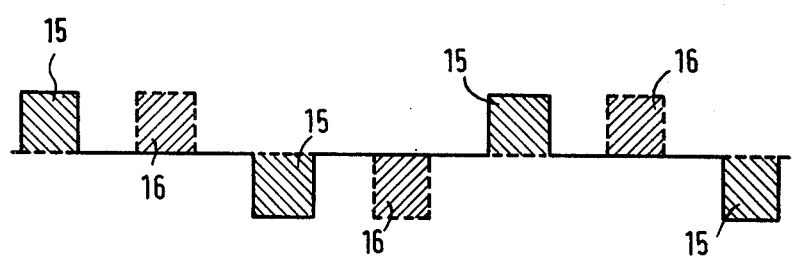
Fig. 5
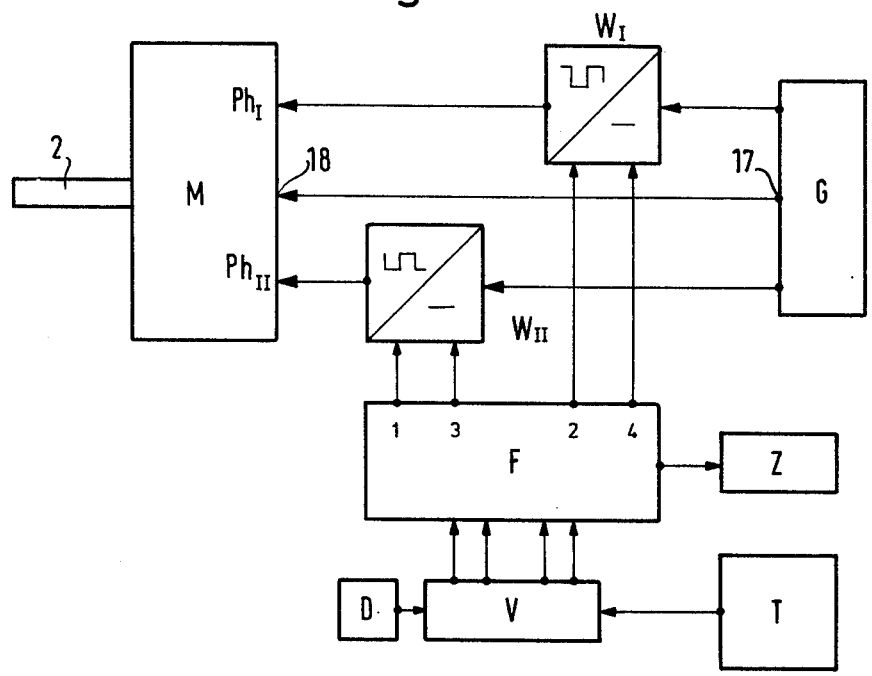

TWO-PHASE ASYNCHRONOUS MOTOR

This invention relates to a two-phase asynchronous motor comprising a stator having stator windings and two portions spacedly disposed parallel to each other, said portions and windings defining field magnets, and a member arranged between said stator portions and mounted for movement with respect thereto, said member consisting of a short-circuit electrically conductive element of planar configuration adapted for the induction therein of an electric current by said field magnets and surrounding portions of the member which define magnet poles.

Such a motor, in which said member is in the form of a rotor supported in said portions of the stator, is described in the Swiss Patent Specification 433,502. In that case all the stator windings are accommodated in a single stator portion. The rotor poles are formed by an integral ferromagnetic disc, which defines the magnetic return path for all the rotor poles. Thus, for the purpose of accommodating the different phases of the stator winding, only a limited amount of space is available and the magnetic circuit is closed partly via adjacent field magnets, so that the iron cores of these field magnets cannot be subjected to full saturation by their own phase.

The object of the present invention is to provide a two-phase asynchronous motor of the kind hereinbefore mentioned, in which the flux flowing in iron cores of all the field magnets is exclusively that of their own phase and in which sufficient space is available for a comparatively large number of field magnets of the two phases.

According to the invention, in a first aspect thereof, a two-phase asynchronous motor comprises a stator having stator windings, a first stator portion and a second like stator portion spacedly disposed parallel to said first portion, said portions and windings defining field magnets; and a member arranged between said stator portions and mounted for movement with respect thereto; said stator windings being arranged in the stator portions on ferromagnetic cores of said stator portions, said cores having widened pole shoes, the stator windings of one phase being accommodated in said first stator portion only, the stator windings of the other phase being accommodated in said second stator portion only, and said stator windings being displaced with respect to each other in the direction of said movement according to the phase angle; said member consisting of a short-circuit electrically conductive element of planar configuration adapted for the induction therein of an electric current by said field magnets, and of ferromagnetic bridges magnetically separated from each other by said short-circuit element and extending from one side of said element to the other; and the magnetic circuit between adjacent stator poles of one said stator portion being completed directly via the pole shoes of the other said stator portion.

According to the invention, in a second aspect thereof, a two-phase asynchronous motor comprises a stator having stator windings, a first substantially disc-shaped stator portion and a second like stator portion spaced axially from said first portion, said portions and windings defining field magnets; and a substantially disc-shaped rotor arranged between said stator portions and mounted rotatably in them; said stator windings being arranged in the stator portions on ferromagnetic cores of said stator portions, said cores having widened pole shoes, the stator windings of one phase being accommodated in said first stator portion only, the stator windings of the other phase being accommodated in said second stator portion only, and said stator windings being displaced with respect to each other according to the phase angle; said rotor consisting of a short-circuit cage of planar configuration, and of ferromagnetic bridges magnetically separated from each other by said short-circuit cage and extending from one side of said cage to the other; and the magnetic circuit between adjacent stator poles of one said stator portion being completed directly via the pole shoes of the other said stator portion.

Thanks to this construction, the field magnets of each phase have their own stator portion available and the iron cores of all the field magnets can be subjected to full saturation by their own phase. Consequently the electric motor embodying the invention is of low weight relative to its dimensions and combines a high speed with a high force or (in the case of a motor according to said second aspect of the invention) a high torque.

Motors of the kind hereinbefore mentioned and previously proposed have four stator poles, but a large number of rotor poles; they do not have a decidedly asynchronous performance. If, however, the number of rotor poles coincides with that of the stator poles, the motor starts up asynchronously, but thereafter its performance is that of a synchronous motor. In order to improve the asynchronous performance, a difference of one or two poles between the aforesaid member (e.g. rotor) and the stator suffices; for reasons of symmetry, such an arrangement is generally to be preferred. Consequently, in the motor embodying the invention there is preferably only a small difference between the number of poles of said member (e.g. rotor) and the number of stator poles.

Since the two field magnet systems in a motor according to the invention are arranged in two planes entirely separately from each other, sufficient room is available to make the field coils in the form of aluminium strip coils. The said member requires no short-circuiting connection at its ends and, when in the form of a rotor, is preferably in the form of a relatively thin disc, preferably of aluminium, in which the ferromagnetic bridges are inserted. Consequently such a rotor is very light and particularly suitable for high speed operation.

In order to achieve as high a force (e.g. torque in the case where said member is a rotor) as possible for any given dimensions, it is advantageous to drive the motor not by sinusoidal AC but by rectangular pulses. The speed of movement of said member relative to the stator (i.e. the speed of rotation where said member is a rotor) may be varied by varying the supply frequency, and the different voltage requirements of the motor for different such speeds are provided by variation of the mark-to-space ratio of the two phases. In this way the force or torque remains at its optimum value over the entire range of the motor's operation.

Instead of being arranged on the circumference of a circle (as in the case of a motor according to said second aspect of the invention), two mutually oppositely arranged field magnet systems comprising the field magnets of said two stator portions may be arranged in a straight line. In this case one obtains a linear motor with a conductor rail which is displaceable between the two magnet systems and in which said ferromagnetic bridges are embedded at right angles to the direction of movement. Such an arrangement defines "magnetic chain conductors" in which terminal members thereof require special adaptation. By contrast with a three-phase motor, this is readily possible here. A linear motor of this construction is of particular interest, because an eccentrically disposed conductor rail is automatically inserted in the gap between the magnet systems and may even be subjected to a considerable load. In the transverse direction the conductor rail may be accurately centered between the phases by means of an electronic compensating circuit.

One form of motor, and an electric power supply system therefor, embodying the invention, will now be described, by way of example, with reference to the accompanying drawings, in which:

FIG. 4 is a diagram explaining the variation in speed of movement of the aforesaid member (e.g. the speed of rotation of the rotor) by means of variation of the mark-to-space ratio; and FIG. 5 is a block diagram of the electric power supply for the motor.

Figure 1:
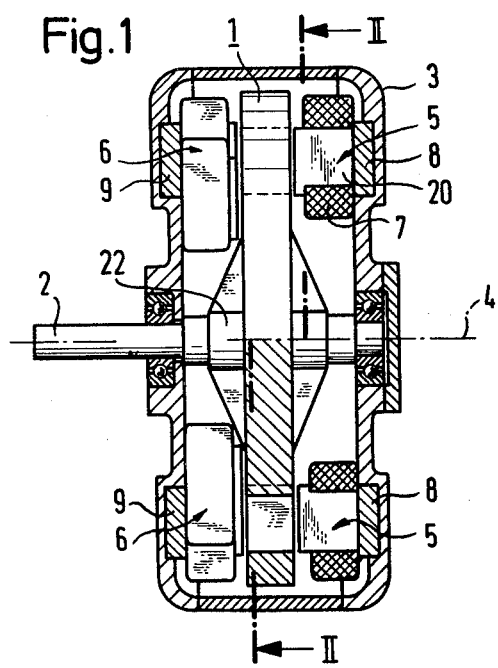
FIG. 1 is an axial section of the motor along the line I—I in FIG. 2.
Figure 2:
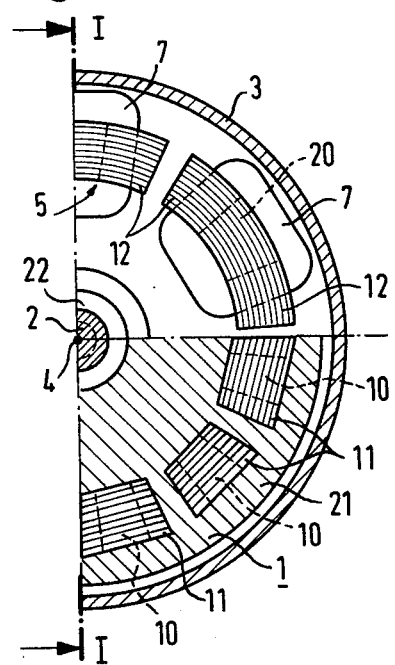
FIG. 2 is a section perpendicular to the axis in two different planes corresponding to the line II—II in FIG. 1.

The basic construction of the motor is apparent from FIGS. 1 and 2. A member, in the form of a disc-shaped rotor 1, is secured to a shaft 2, which in its turn is supported in a motor housing 3 for rotation about its axis 4.

On the sides of the rotor two field magnet systems 5 and 6 of a first and a second stator portion respectively and of like construction face each other. In the example shown, each magnet system has six poles, so that nominal frequency of 400 Hz produces a rotating field with a speed of 7500 r.p.m. Corresponding to the phase displacement of 90°, the two field magnet systems are relatively displaced by 30°. Thus the total number of field magnets provided is 12.

The winding 7 of a field magnet is shown cross-hatched in FIG. 1. From the upper half of FIG. 2 it will be apparent that the winding is of substantially rectangular cross-section. This makes it possible to use a strip winding of aluminium, which offers considerable thermal and mechanical advantages. The total weight of the motor is thereby reduced by 15% as compared with copper windings. The winding 7 is mounted on an iron core 20 of thin transformer laminations. At its end facing the rotor 1, the iron core has a pole shoe 12 which is widened in the direction of the circumference. The magnetic circuits of the field magnets of a magnet system 5, 6 respectively are completed via a short-circuiting ring 8, 9 respectively. The disc-shaped rotor 1 comprises a short-circuit cage consisting of a conducting aluminium member 21. Ferromagnetic bridges 10 of trapezoidal section are cast into it. The number of the bridges 10 is different from that of the field magnets 5 and 6, in order to avoid dead points during start-up of the motor. In the motor shown in the drawing, for example, eleven rotor bridges are provided as compared with twelve field magnets.

Figure 3:
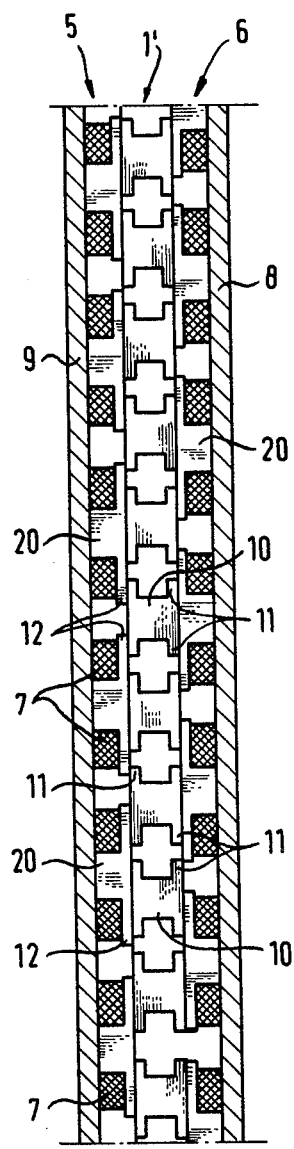
FIG. 3 is a developed view of the magnetic system of the motor, and at the same time a representation showing the principle of a linear motor.

The bridges 10 consist of silicon sheet metal elements which are laminated in the tangential direction and whose I-shaped configuration is best apparent from FIG. 3. Thereby the bridged are provided with widened end plates 11 in the circumferential direction which face the widened pole shoes 12 of the field magnets. The mutual spacing between adjacent end plates 11 should approximately correspond to that of adjacent pole shoes 12. Likewise the overall conductive cross-section of the element 21 between the bridges should be approximately equal to the overall winding area of a field magnet system and the aggregate iron cross-section of the bridges should approximate to the iron cross-section of a field magnet system.

In operation, the magnetic circuit between field poles of opposite polarity which face each other is completed via the bridges of the rotor disposed therebetween. The rotating magnetic field which is built up by the interaction of the two field magnet systems through the agency of the rotor induces in the element or short-circuit cage 21 eddy currents, which flow around the bridges. The powerful magnetic fields produced by these eddy currents interact with the rotating magnetic field passing through the rotor, whereby the rotor is caused to rotate. Since, by comparison with the short-circuited rotors previously proposed, the rotor is of very light construction, it has a low inertia and is therefore readily and rapidly capable of achieving high speeds as well as variation and reversal thereof.

If the two field magnet systems are supplied by a sinusoidal alternating current, a flux is produced in the rotor which is 40% max. greater than the magnetic flux in the field poles. Consequently the motor can only be subjected to 70% of the possible torque.

If, however, the field magnets of the two systems are supplied by phase-displaced rectangular pulses, which preferably do not overlap, there is no interference between the magnetic fluxes in the rotor and the torque can be fully utilised.

Thus, in FIG. 4a, rectangular pulses 15 are shown, with which the magnets 5 are supplied and rectangular pulses 16 which are phase-displaced by 90° with respect to the pulses 15 and with which the magnets 6 are supplied. Since the two rows of pulses do not mutually overlap, only one magnetic flux at a time flows through the rotor and the two magnetic fluxes cannot become superimposed or interfere with each other in the rotor. Incidentally, the effective value of the stepped form of the alternating current shown differs from a sinusoidal current of the same amplitude by less than 2%.

In order to reduce the speed, the frequency of the alternating current supplied has to be reduced. At the same time the motor is capable of accepting only a correspondingly lower voltage. In the case of a pulsed supply, this can be achieved in a simple manner by reducing the mark-to-space ratio, as shown in FIG. 4b. It will be seen that the individual rectangular pulses 15 and 16 are still of the same width as before, but they are spaced further apart, i.e. the "on" period is kept constant, but the "off" period between successive pulses is increased for the purpose of reducing the frequency.

FIG. 5 shows the basic arrangement for producing two-phase pulses of variable frequency from a direct voltage. A direct voltage source G which is, for example, in the form of a battery, which is chargeable through a rectifier or exchangeable, is tapped at its centre at 17. The tapping leads to a connecting point 18 between the two phases PH I and PH II for supplying the field magnet systems of the motor M. The pulses are produced by means of two inverters WI and WII, which are in the form of electronic semiconductor components. Between the phases a coupling capacitor may be connected in circuit, which damps the circuit breaking voltages derived from the inductance of the motor M and transmits the energy liberated to the other phase concerned.

The inverters WI and WII are preferably controlled by a clock pulse generator T. It oscillates at four times the nominal frequency; the nominal frequency is that frequency at which the motor operates at maximum speed. In a pulse distributor V the nominal frequency is produced and the pulses are distributed in the correct sequence and at the correct interval for controlling the inverters. The length of the individual pulses is determined by a pulse former F. Via isolating amplifiers the inverters can be controlled in such a way as to eliminate any DC components. A control device D serves to provide speed setting and/or reversal of the direction of rotation. The operation can be monitored by means of an indicating instrument Z. These control electronics are capable of almost complete integration.

It is not essential that the number of the rotor bridges should differ from the number of field magnets exactly by one. If, for example, a total of 12 field magnets are provided, 8 or 10 rotor bridges can, with advantage, be provided. In the case of 16 field magnets, 14 bridges are recommended etc.

FIG. 3 also shows the principle of the arrangement of a linear motor. The field magnets 5 and 6 are then arranged in two parallel straight rows and accommodate between them a straight conducting rail 1', in which laminated bridges 10 are embedded at regular intervals. If a linearly progressing field is produced in the field magnets, the conducting rail 1' tends to follow this field and displaces itself in the same direction. The construction shown has, inter alia, the advantage that a conducting rail 1' which is disposed eccentrically perpendicular to the plane of the paper is automatically centered. In the transverse direction the precise centring between the field magnets may be achieved by means of an electronic compensating circuit. The electronic control, which operates in an inertia-less manner, enables the acceleration and speed of the moving parts to be adapted to the requirements in optimum manner. It would even be possible to provide the conducting rail with links after the fashion of caterpillar tracks, which may be of significance in conveyor installations.

In an example which has been carried out, the rotor 1 had a diameter of approximately 170 mm and a thickness of approximately 16 mm. The short-circuit cage 21 consisted of aluminium of the highest purity and was shrunk on to the shaft 2, which was made of steel, together with reinforcements 22. The centres of the 11 bridges 10 of transformer laminations of 0.5 mm thick were disposed on a circle of 60 mm radius. The widened end plates 11 were trapezoidal and were mutually spaced by 8 mm. The arcuate pole shoes 12 of the field magnets had the same spacing. The air gap between the pole shoes 12 and the end faces of the rotor was 0.3 mm. At a supply voltage of 200 V the motor could be loaded up to 300 W.

It has been found by experiment that speeds of up to 20,000 r.p.m. and more can be achieved with motors of the construction described. Thanks to the low weight and the low inertia, the motor is, for example, suitable for high speed drives such as gyroscopes and centrifuges, drives in which the speed is controlled or regulated, where a very large range of regulation can be achieved, such as machine tools and traction drives. In the case of motor vehicles, the motors may, defining for example the driving motors, be directly incorporated in the wheels.

In the linear embodiment, the motor may serve as a drive for machine tools with linear movement, such as planing machines or saws, as well as for conveyor installations and cable railways or the like.

The above-mentioned automatic centring may also be utilised with advantage for providing a contactless dynamic bearing arrangement for the aforesaid member. Particularly where this member is in the form of a rotor, such an arrangement is especially suitable for high speed drives such as gyroscopic instruments, spinning tubes, dental drills or the like.

I claim:

1. A two-phase asynchronous motor comprising:
   a stator having stator windings, said stator including a first stator portion and a second like stator portion spacedly disposed parallel to said first stator portion, said stator portions including ferromagnetic cores which together with said stator windings define field magnets, said cores having widened pole shoes, and said stator windings being arranged in said stator portions on said ferromagnetic cores, the stator windings of one phase being accommodated in said first stator portion only and the stator windings of a second phase being accommodated in said second stator portion only, said stator windings being displaced with respect to each other in a direction of movement according to the phase angle; and,
   a member arranged between said stator portions and mounted for movement with respect thereto, said member including a short-circuit electrically conductive element of planar configuration adapted for induction therein of an electrical current by said field magnets and further including ferromagnetic bridges magnetically separated from each other by said short-circuit element and extending from one side of said element to the other and including broadened end plates thereon,
   wherein said pole shoes and said end plates will complete a magnetic circuit between two adjacent stator poles of one stator portion directly via a pole shoe of said other stator portion.

2. A two-phase asynchronous motor comprising:
   a stator having stator windings, said stator including a first substantially disc-shaped stator portion and a second like-shaped stator portion spaced axially from said first stator portion, said stator portions including ferromagnetic cores which together with said stator windings define field magnets, said ferromagnetic cores having widened pole shoes, said stator windings being arranged on the stator portions on said ferromagnetic cores of said stator windings, the stator windings of one phase being accommodated in said first stator portion only and the stator windings of a second phase being accommodated in said second stator portion only, said stator windings being displaced with respect to each other according to the phase angle; and,
   a substantially disc-shaped rotor arranged between said stator portions and mounted rotatably therebetween, said rotor including a short-circuit cage of planar configuration and further including ferromagnetic bridges magnetically separated from each other by said short-circuit cage and extending from one side of said cage to the other, said ferromagnetic bridges including broadened end plates, wherein said pole shoes and said end plates will complete a magnetic circuit between two adjacent stator poles of one stator portion directly via a pole shoe of said other stator portion.

3. A motor according to claim 1, wherein said member has a plurality of magnetic poles and wherein there is only a small difference between the number of poles of said member and the number of stator poles.

4. A motor according to claim 2, wherein said rotor has a plurality of magnetic poles and wherein there is only a small difference between the number of rotor poles and that of the stator poles.

5. A motor according to claim 1, wherein the cross-section of said element between the bridges substantially corresponds to the area occupied by the windings of the field magnets.

6. A motor according to claim 2, wherein the cross-section of the short-circuit cage between the bridges substantially corresponds to the area occupied by the windings of the field magnets.

7. The motor of claim 2 further comprising:
a first magnetic short-circuiting ring connecting the cores of said first stator portion; and,
a second magnetic short-circuiting ring connecting the cores of said second stator portion.

8. A motor according to claim 1, wherein the bridges consist of laminated silicon-iron sheets.

9. A motor according to claim 1, wherein the windings of the field magnets consist of wound aluminum strip.

10. A motor according to claim 1, said motor being in the form of a linear motor.

* * * * *